(12) United States Patent
Voights

(10) Patent No.: US 6,266,208 B1
(45) Date of Patent: Jul. 24, 2001

(54) INTEGRATED FILTER FOR USE IN A DISK DRIVE

(75) Inventor: Ronald L. Voights, Longmont, CO (US)

(73) Assignee: Maxtor Corporation, Longmont, CO (US)

(*) Notice: Subject to any disclaimer, the term of this patent is extended or adjusted under 35 U.S.C. 154(b) by 0 days.

(21) Appl. No.: 09/330,484

(22) Filed: Jun. 11, 1999

(51) Int. Cl.[7] .................................................. G11B 17/02
(52) U.S. Cl. ............................................. 360/97.02
(58) Field of Search ........................ 360/97.02–97.04; 55/482

(56) References Cited

U.S. PATENT DOCUMENTS

| | | | |
|---|---|---|---|
| 4,329,722 | 5/1982 | West | 360/98 |
| 4,633,349 | 12/1986 | Beck et al. | 360/97 |
| 4,885,652 | 12/1989 | Leonard et al. | 360/133 |
| 5,025,337 | 6/1991 | Brooks | 360/97.03 |
| 5,307,222 | 4/1994 | Dion | 360/97.02 |
| 5,406,431 | 4/1995 | Beecroft | 360/97.02 |
| 5,455,728 | 10/1995 | Edwards et al. | 360/105 |
| 5,602,700 | 2/1997 | Viskochil et al. | 360/105 |
| 5,869,009 | 2/1999 | Bellefeuille et al. | 422/171 |

OTHER PUBLICATIONS

U.S. application Ser. No. 09/330,435, filed Jun. 11, 1999, entitled "Recirculation Filter For Use In A Disk Drive".

*Primary Examiner*—Robert S. Tupper
(74) *Attorney, Agent, or Firm*—David M. Sigmond

(57) ABSTRACT

An integrated filter for a disk drive includes a recirculation filter element, a chemical filter element, and a breather filter element within a single filter cartridge. The filter elements are mounted within a support structure that is adapted for easy insertion into a disk drive. The support structure includes a base portion that fits within a recessed pocket in a baseplate of the disk drive. The disk drive includes structures for channeling air flow into the integrated filter structure during disk drive operation.

28 Claims, 8 Drawing Sheets

VIEW A-A

INTEGRATED FILTER FOR USE IN A DISK DRIVE

FIELD OF THE INVENTION

The invention relates generally to disk based data storage systems and, more particularly, to filter structures for use therein.

BACKGROUND OF THE INVENTION

A disk drive is a data storage device that stores data in concentric tracks on a disk shaped medium. Data is read from the medium by spinning the medium about a central axis while positioning a transducer near a desired track of the medium to sense the data. The transducer provides an electrical signal representative of the sensed data to data processing circuitry within the disk drive which converts the electrical signal to a format that is recognizable by an attached host unit. The converted data signal is then delivered to the host unit for use thereby. Disk drives can store data in any of a number of different forms, such as magnetic data storage and optical data storage.

Disk drive units are normally enclosed within a housing to protect the workings of the drive from the exterior environment. As can be appreciated, any undesirable substances that exist within the disk drive housing can have a deleterious effect on the operation thereof. For example, in a magnetic disk drive, particles and volatile gases within the drive housing can result in performance problems such as stiction between the magnetic transducer and the disk, transducer crashes, and thermal asperities. To reduce such occurrences, the level of airborne particles and gases within the disk drive should be kept low.

Therefore, there is a need for a filtering structure to reduce the levels of undesired substances within the housing of a disk drive.

SUMMARY OF THE INVENTION

The present invention relates to an integrated filter structure for use in a disk drive. The integrated filter includes a recirculation filter, a breather filter, and a chemical filter all housed within a single support structure. The recirculation filter is operative for reducing the level of airborne particles circulating within the disk drive housing. These airborne particles can include, for example, wear particles generated by friction between the transducer and the disk medium of the disk drive during start and stop operations. The breather filter is operative for trapping solid particles entering the disk drive housing from an exterior environment through a breather port in the housing. Likewise, the chemical filter is operative for absorbing undesirable gases entering the disk drive from the exterior environment. The integrated filter can also include a diffusion path for providing condensation of vapors within air entering the disk drive housing through the breather port. During disk drive manufacture, the integrated filter is inserted into the disk drive housing as a single unit, thereby reducing the number of steps required to assemble the drive.

In one embodiment of the invention, the filter elements are housed within a frame having at least two cavities. The first cavity carries the recirculation filter and the second cavity carries the chemical and breather filters. The first cavity is located above the second cavity and includes two sidewalls having inclined upper edges. The recirculation filter is attached to the upper edges of the two sidewalls forming an enclosed space within the first cavity having a single input port for receiving circulating air. Because the upper edges of the sidewalls are inclined, a relatively large recirculation filter input surface is achieved. The second cavity of the filter frame includes first and second fluid ports, the first port for communicating with an environment external to the disk drive housing and the second port for communicating with the internal chamber of the disk drive. In this manner, air flow from the exterior environment into the disk drive housing occurs through the chemical and breather filters carried by the second cavity.

In another embodiment, a frame having a single cavity is provided. The chemical filter, the breather filter, and the optional diffusion channel are disposed within the single cavity. In addition, the recirculation filter is bonded to the upper edges of the sidewalls of the cavity. Air currents impinging upon the recirculation filter create a low-pressure condition within the cavity that draws air into the disk drive from the exterior environment through the chemical and breather filters and the diffusion channel.

Preferably, the support structure of the integrated filter is shaped to conform to a recessed pocket within the baseplate. During assembly of the disk drive, the integrated filter is inserted into the pocket of the baseplate which thereafter holds the integrated filter in a fixed position. The baseplate can also include a sloped recessed portion leading to the pocket area for creating a low pressure region that channels circulating air in a lower portion of the disk drive chamber into the recirculation filter. A second recessed portion can also be provided in the baseplate on another side of the pocket to provide a low pressure region for facilitating air flow through the breather and chemical filters. After the integrated filter has been inserted into the pocket of the baseplate, the second port of the second cavity communicates directly with the second recessed portion of the baseplate.

In one embodiment, a dam structure is provided on a disk drive cover plate to increase the filtering efficiency of the integrated filter. In a typical disk drive, a gap is formed between a lower surface of the cover plate and the upper surface of the uppermost disk in the drive. The dam structure of the invention adds a dropped portion to the lower surface of the cover plate in an area near the location of the integrated filter, thus reducing the height of the gap between the cover plate and the upper disk and increasing the air pressure in this region. The increased air pressure is operative for channeling circulating air currents from the region between the upper disk and the cover plate into the recirculation filter.

DETAILED DESCRIPTION OF THE PREFERRED EMBODIMENTS

The present invention relates to an integrated filter assembly for use in a disk drive that includes a recirculation filter, a chemical filter, and a breather filter within a single cartridge. The integrated filter is easily inserted into the housing of the disk drive as a single unit, thus eliminating the need to separately insert multiple filters within the disk drive during manufacture. The integrated filter is more reliable than past filter designs because it reduces the possibility that a filter will be improperly seated within the disk drive housing during disk drive assembly. In addition, the integrated filter is capable of providing many performance advantages over filter designs of the past. For example, the integrated filter can be designed in a manner that reduces air turbulence within the disk drive, thus reducing disk flutter and transducer perturbation effects that tend to increase bit error rates (BERs). The integrated filter is also capable of achieving enhanced filtration of the internal environment of the disk drive. Preliminary testing of filter prototypes in accordance with the invention has indicated up to a 150 percent improvement in particle reduction over previous filter designs. In addition, the integrated filter is relatively simple and inexpensive to manufacture.

Figure 1:
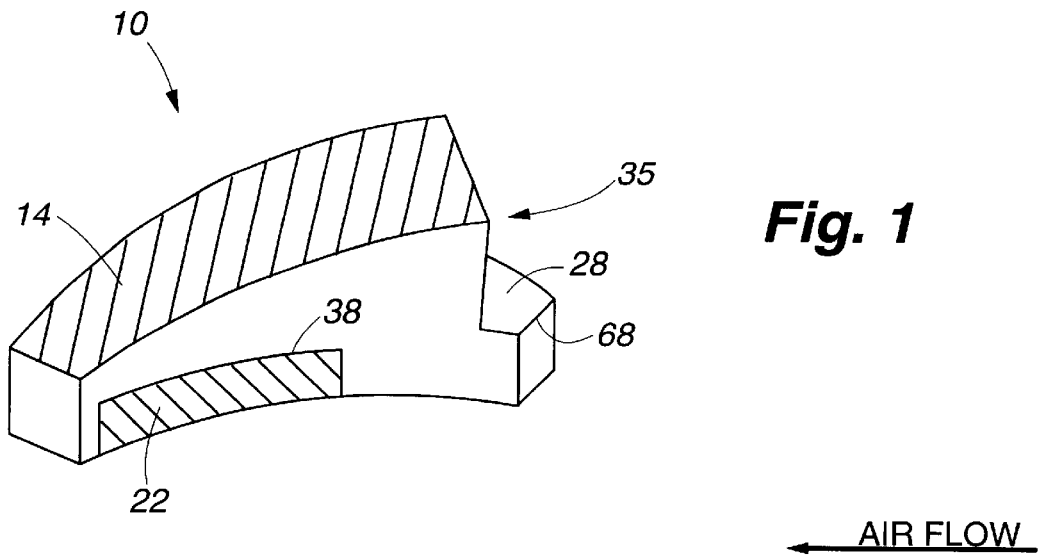
FIG. 1 is an isometric view of an integrated filter assembly in accordance with one embodiment of the present invention.
Figure 2:
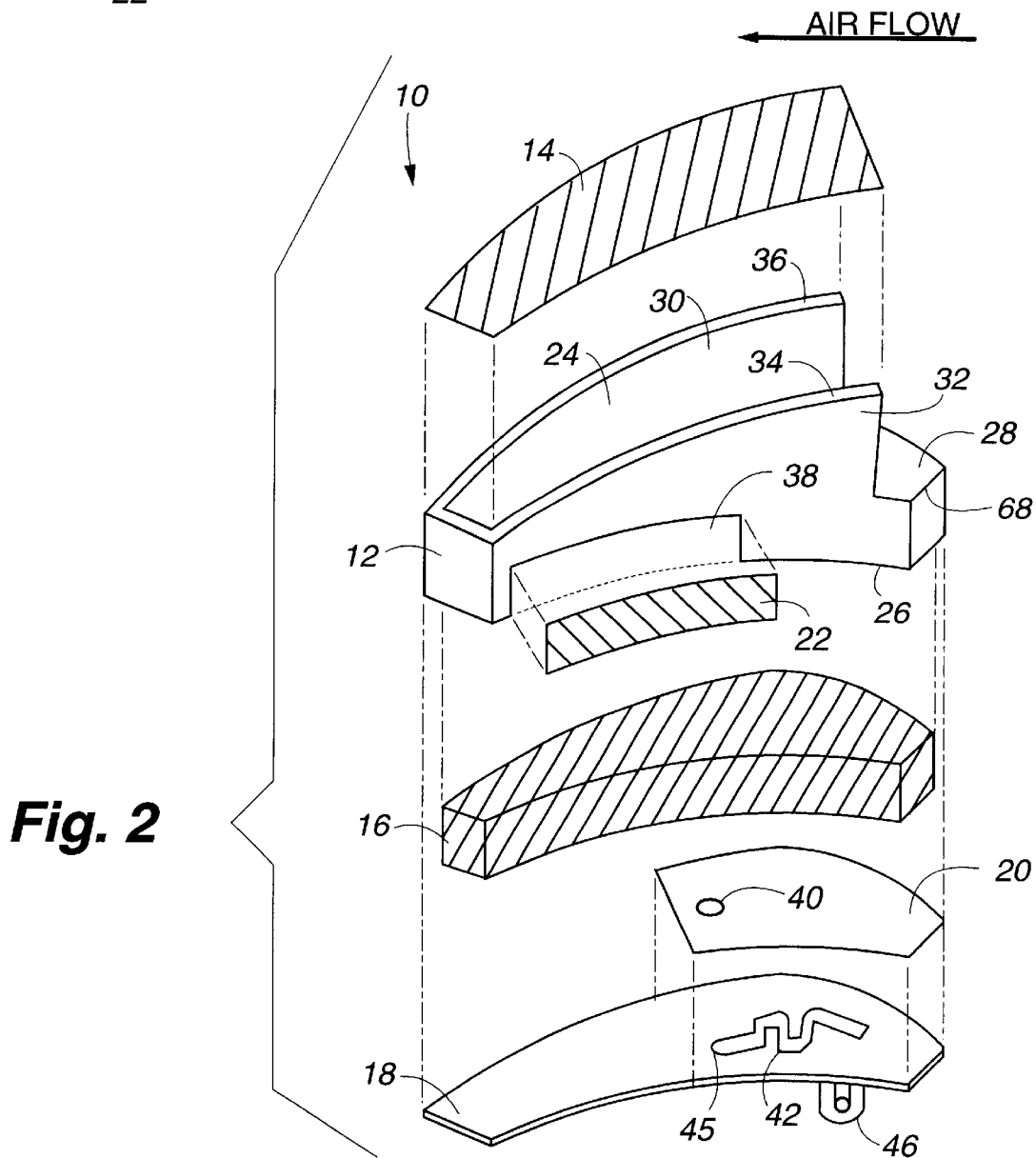
FIG. 2 is an exploded isometric view of the integrated filter assembly of FIG. 1.

FIGS. 1 and 2 are an isometric view and an exploded isometric view, respectively, of an integrated filter 10 in accordance with one embodiment of the present invention. As shown in FIG. 2, the integrated filter 10 includes: a frame 12, a recirculation filter 14, a chemical filter 16, a diffusion path plate 18 having a breather tube 46, a diffusion cover plate 20, and a breather filter 22. The frame 12 includes an upper cavity 24 and a lower cavity 26. The two cavities 24, 26 in the frame 12 are separated from one another by a floor 28 forming the lower boundary of the upper cavity 24. The upper cavity 24 is also bounded by a pair of side walls 30, 32 that define an internal volume of the cavity 24.

The recirculation filter 14 is attached to the upper edges 34, 36 of the two sidewalls 30, 32, thus enclosing the internal volume of the upper cavity 24 except for a single input port 35 (see FIG. 1). Preferably, the recirculation filter 14 is bonded to the edges 34, 36 using a technique such as ultrasonic fusion or heat fusion, although other attachment techniques can also be used. During disk drive operation, circulating air within the disk drive housing is forced into the input port 35 of the upper cavity 24. The air flows through the recirculation filter 14, which traps airborne particles within the air, and emerges from an upper surface thereof. Because the recirculation filter 14 is held at an angle, the input surface area of the filter is relatively large and thus produces very efficient filtration performance.

Figure 3:
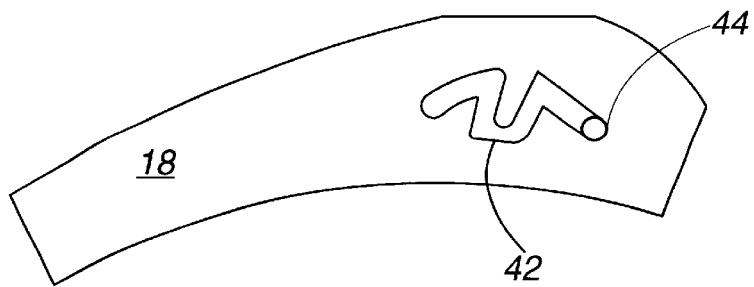
FIGS. 3 and 4 are a top and bottom view, respectively, of a diffusion path plate in accordance with the present invention.
Figure 4:
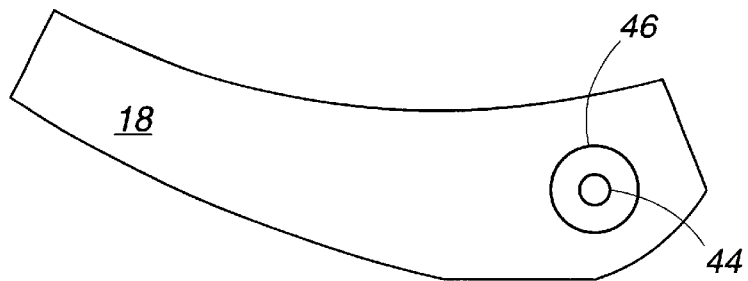
Figure 5:
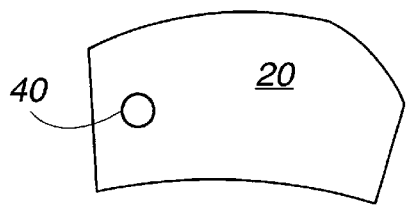
FIG. 5 is a top view of a diffusion cover plate in accordance with the present invention.

The diffusion cover plate 20 and the diffusion path plate 18 form an assembly that provides a diffusion channel within the integrated filter 10 through which air entering the disk drive from an exterior environment must pass. The diffusion channel produces condensation of vapors within the incoming air so that the vapors are not permitted to enter the internal chamber of the disk drive. FIGS. 3, 4, and 5 illustrate the diffusion path plate 18 and the diffusion cover plate 20 in greater detail. FIGS. 3 and 4 are a top and bottom view, respectively, of the diffusion path plate 18 and FIG. 5 is a top view of the diffusion cover plate 20. As illustrated, the diffusion path plate 18 includes a hollowed channel structure 42 in an upper surface thereof. The hollowed channel structure 42 includes a port 44 at one end that extends through the diffusion path plate 18, and the breather tube 46 on the underside of the plate 18, to provide a fluid flow path through the plate 18. Similarly, the diffusion cover plate 20 includes a port 45 to provide a fluid flow path through the diffusion cover plate 20. The diffusion cover plate 20 is attached to the upper surface of the diffusion path plate 18 so that the port 40 is in fluid communication with the hollowed channel structure 42. The underside of the diffusion cover plate 20 thus forms an upper boundary of the channel structure 42 thus confining fluid flow through the assembly to the diffusion channel.

Referring back to FIG. 2, the chemical filter 16 is inserted into the lower cavity 26 of the frame 12 during assembly of the integrated filter 10. The shape of the chemical filter 16 preferably conforms to the shape of the lower cavity 26 so that chemical filter 16 fills an upper portion of the cavity 26. After the chemical filter 16 has been inserted, the diffusion path plate/diffusion cover plate 18/20 assembly is inserted into the lower cavity 26 just below the chemical filter 16. The shape of the diffusion path plate 18 also conforms to the shape of the lower cavity 26 so that the underside of the chemical filter 16 is fully covered. The outer edge of the diffusion path plate 18 preferably forms a seal against the inner walls of the lower cavity 26 to prevent air flow through the junction. This seal can be provided in any of a number of ways including the use of a compression fit between the diffusion path plate 18 and the cavity walls, the use of an adhesive or sealant compound at the juncture, or by bonding the plate 18 to the walls using some other technique. Alternatively, the diffusion path plate 18 can be bonded to the lower edge of the walls of the frame 12 without being fully inserted.

The breather filter 22 is bonded within an opening 38 in a side of the frame 12 that leads into the second cavity 26. As with the recirculation filter 14, the breather filter 22 is preferably attached using ultrasonic fusion or heat fusion techniques, although other attachment techniques are also possible. During disk drive operation, air from the exterior environment enters the integrated filter 10 through the port 44 in the breather tube 46. The air then flows through the diffusion channel 42 and into the chemical filter 16 via port 40. The air then flows through the chemical filter 16 and emerges from the filter 10 through the opening 38 having the breather filter 22 affixed therein.

Figure 6:
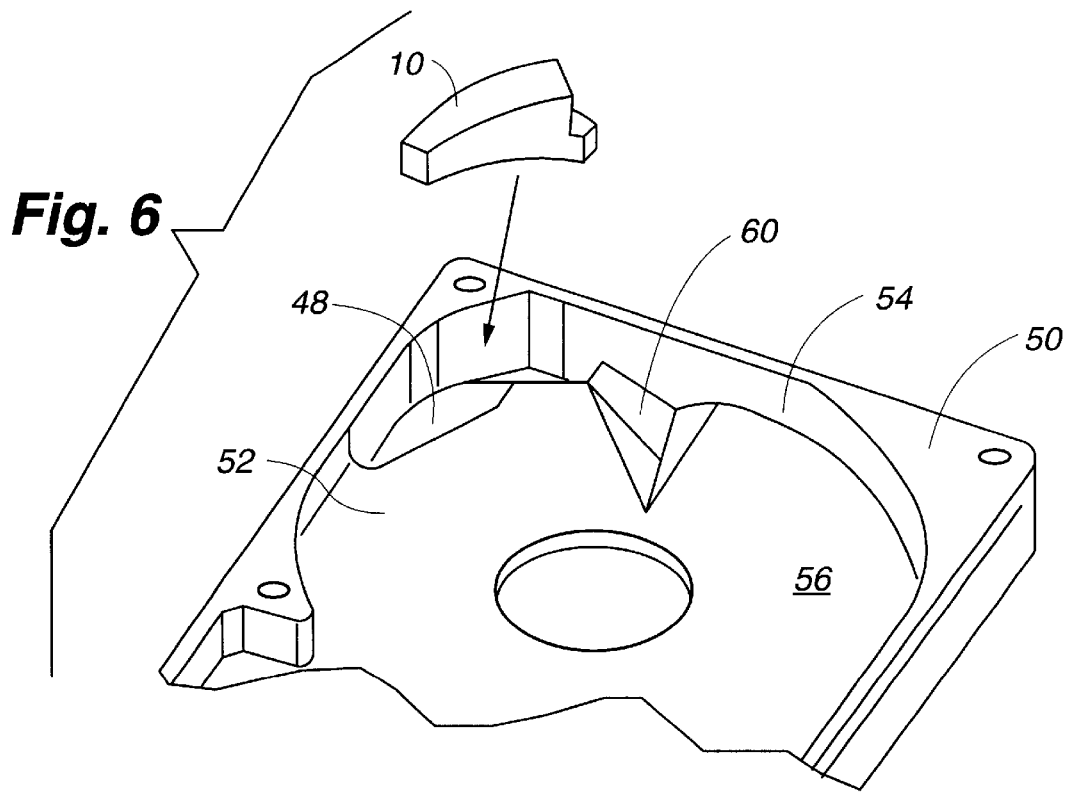
FIG. 6 is an isometric top view of a baseplate illustrating the insertion of an integrated filter in accordance with one embodiment of the present invention.

FIG. 6 is an isometric view illustrating the baseplate 50 of a disk drive into which the integrated filter 10 can be inserted. The baseplate 50 includes an internal chamber 52 into which a disk stack (not shown) and a corresponding spin motor (not shown) are installed. The internal chamber 52 is defined, at least in part, by a substantially circular shroud 54 which follows the outer periphery of the disk stack. Also defining the internal chamber 52 is a floor surface 56 which lies in a substantially horizontal plane and is parallel to the disks in the disk stack. The baseplate 50 also includes a recessed pocket 48 in a corner of the internal chamber 52 into which the integrated filter 10 is inserted. The dimensions of the pocket 48 conform to certain external dimensions of the integrated filter 10. In addition, the pocket 48 includes a breather port 57 in a floor thereof (see FIG. 7) that provides a fluid flow path between the internal chamber 52 of the disk drive and the exterior environment.

During disk drive assembly, the integrated filter 10 is inserted into the pocket 48 where it is pressed down until the underside of the filter 10 contacts the floor of the pocket 48. In a preferred embodiment, the integrated filter 10 is held in place, at least partially, by a compression fit between the frame 12 and the internal dimensions of the pocket 48. In an alternative approach, snaps or tabs are provided for holding the filter 10 in place within the pocket 48. Other approaches for securing the filter 10 in place within the pocket 48, such as the use of adhesives, can also be used. When the integrated filter 10 is properly installed, the breather tube 46 on the lower surface of the filter 10 fits within the breather port 57 in the floor of the pocket 48 to provide fluid communication between the exterior environment and the inside of the second cavity 26 of the frame 12. Because it is important that nearly all of the air flowing into the disk drive from the exterior environment travel through the filters within the second cavity 26 of the frame 12, the seal between the breather tube 46 and the breather port 57 should be relatively tight. Thus, a sealing device, such as an O-ring, may be provided.

Figure 7:
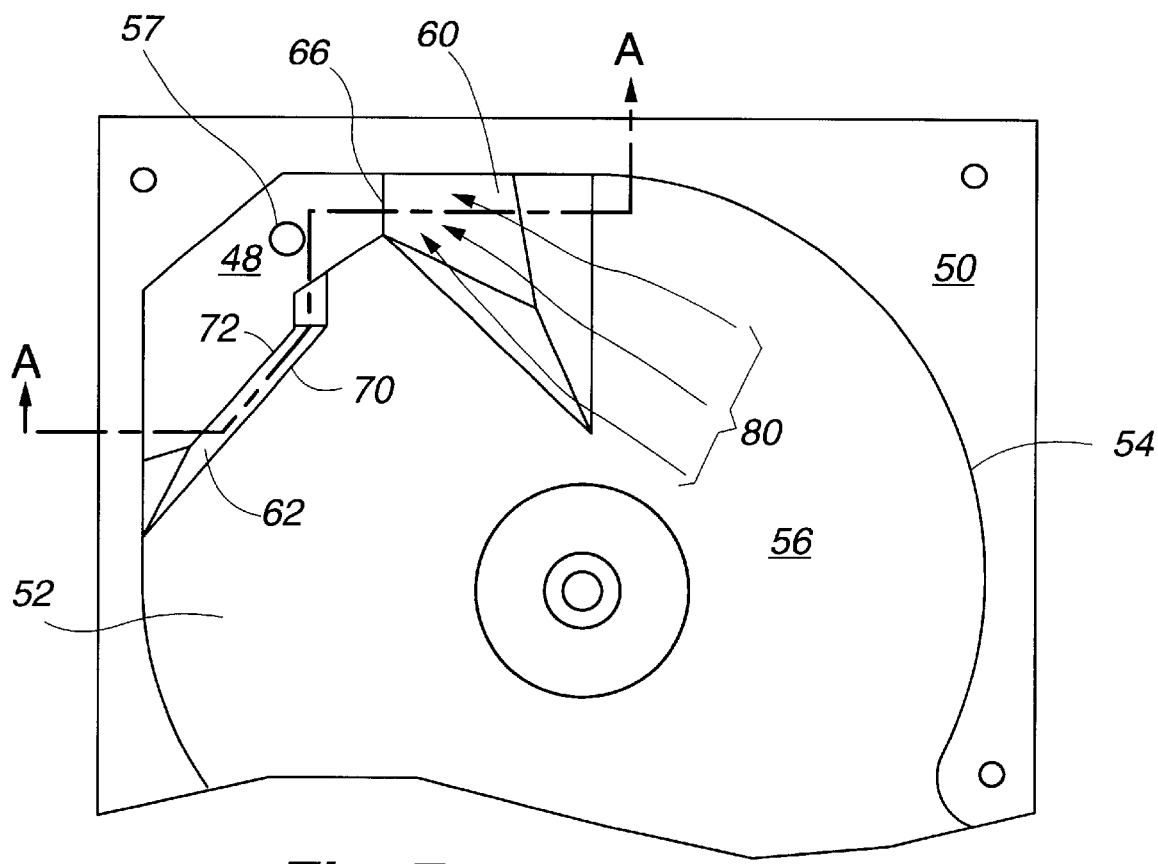
FIG. 7 is a simplified top view of the baseplate of FIG. 6 illustrating the air flow down a first recessed ramp portion thereof.
Figure 8:
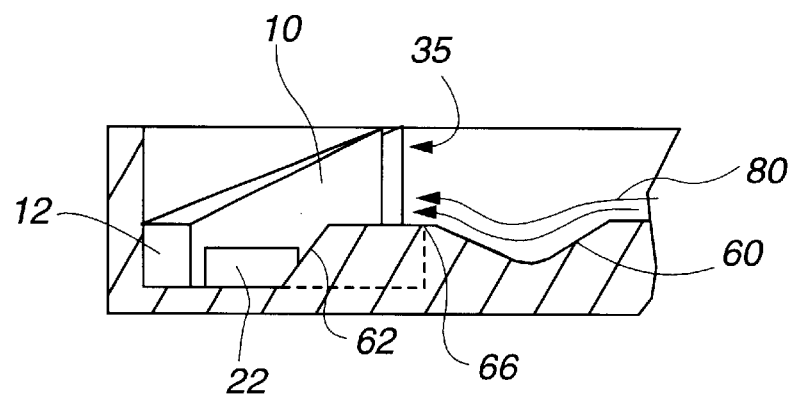
FIG. 8 is a simplified cross-sectional side view illustrating air flow patterns within a disk drive in one embodiment of the present invention.

The region between the lowermost disk in the disk stack and the surface 56 of the baseplate 50 has historically been one of the most contaminant laden portions of the internal disk drive environment. This is supported by the fact that, in the past, head crashes, thermal asperities, and disk stiction problems occurred a disproportionate amount of the time on the lower surface of the lowermost disk in the drive. Until now, methods for dealing with these disproportionate contaminant levels have been inadequate. In accordance with the present invention, this region can be filtered so that contaminant levels in the area are more in line with other areas of the internal chamber 52 of the disk drive. FIG. 7 is a simplified top view of the baseplate 50 illustrating a first recessed portion 60 within the baseplate 50 that is operative for channeling air currents 80 traveling between the lowermost disk and the surface 56 of the baseplate 50 into the input port 35 of the integrated filter 10. The first recessed portion 60 comprises a depression in the baseplate surface 56 that gradually declines from the surface 56 (in the direction of air flow 80) and then inclines up to an edge 66 at the border of the pocket 48. In another embodiment of the invention, the first recessed portion 60 includes only a decline from the surface 56 and the edge 66 is substantially lower than the surface 56. FIG. 8 is a sectional side view of the filter region of the baseplate 50 showing the air flow patterns of the air just above the baseplate surface 56. As shown in FIGS. 7 and 8, the initial decline in the first recessed portion 60 increases the air volume in the region and thus generates a low-pressure zone which draws the circulating air outward and downward. The air then rises up the incline area of the first recessed portion 60 toward the edge 66. When the integrated filter 10 is inserted into the pocket 48, an edge 68 of the frame 12 (see FIG. 1) lines up with the edge 66 so that the air currents 80 flow into the input port 35 of the filter 10. Preferably, the elevation of the edge 66 of the baseplate 50 is equal to the elevation of the floor 28 of the installed filter 10. Because the first recessed portion 60 uses gradual slopes, very little air turbulence is created.

As shown in FIG. 7, the baseplate 50 also includes a second recessed portion 62 that is adjacent to the pocket 48. The second recessed portion 62 also creates a low pressure zone due to an increased volume and the rotating disks. This low pressure zone is operative for drawing air into the disk drive housing from the exterior environment through the breather port 57 in the baseplate and thus through the chemical and breather filters 16, 22 and the diffusion channel 42. This drawing of external air through the integrated filter 10 reduces the likelihood that air will be drawn into the disk drive housing through unfiltered leakage paths when pressure differentials exist between internal and external environments. The second recessed portion 62, as shown in FIGS. 7 and 8, includes a gradual incline starting at edge 72 and ending at edge 70.

During operation of the disk drive, the disks in the disk stack (or the sole disk in a single disk system) rotate about a central axis within the internal chamber 52 of the disk drive. To provide data transfer between the one of the disks and an external host system, a transducer is positioned near a predetermined track of the rotating disk and an information transfer is initiated. The rotation of the disks creates circumferential air currents within the internal chamber 52 of the disk drive in the direction of disk rotation. These air currents exist between individual disk pairs, between the upper surface of the uppermost disk and the cover plate of the disk drive, and between the lower surface of the lowermost disk and the floor surface 56 of the baseplate 50. In areas where the disks are surrounded by the shroud 54, the air currents are predominantly contained within the disk region. However, as the air currents approach the integrated filter region, they are drawn outward toward the filter input port 35 due to a lower pressure in the filter region. Much of this air is channeled into the input port 35 of the integrated filter 10 where it passes through the recirculation filter 14 which removes airborne particles from the air. The resulting "clean" air then emerges from the rear portion of the recirculation filter 14 and continues to circulate within the drive.

As discussed earlier, the chemical and breather filters 16, 22 are used primarily during periods when pressure differences exist between the internal chamber 52 of the disk drive and the exterior environment. For example, when the disk drive is brought from a high altitude to a low altitude in a relatively short time period, the increased pressure at the low altitude will cause air to flow into the disk drive through the breather port 57. Likewise, an increase in temperature within the disk drive will cause an increase in pressure which will result in a flow of air out of the disk drive through the breather port 57. Because the breather port 57 is available as a relatively low pressure path for air flow, air flow through other undesired paths (e.g., leakage paths) is minimized. The integrated filter 10 of the present invention ensures that air entering the disk drive housing from the exterior environment due to pressure differentials (or other reasons) is filtered of airborne particles and undesirable gases and vapor before it reaches the internal chamber 52.

Air entering the disk drive through the breather port 57 first passes through the diffusion channel 42 within the diffusion path plate/diffusion cover assembly 18/20 of the integrated filter. As described above, the diffusion channel 42 allows vapors within the incoming air to condensate before the air reaches the internal chamber 52. The air next enters the chemical filter 16 which removes potentially harmful chemicals from the air, such as volatile gases that can cause damage within the disk drive. The chemical filter 16 can also include a desiccant for removing any residual water vapor from the incoming air that was not condensed in the diffusion channel 42. The air flows through the chemical filter 16 and exits the integrated filter 10 through the breather filter 22 and into the second recessed portion 62. The clean air then travels up the incline of the second recessed portion 62 and into the internal chamber 52 of the disk drive.

Figure 9:
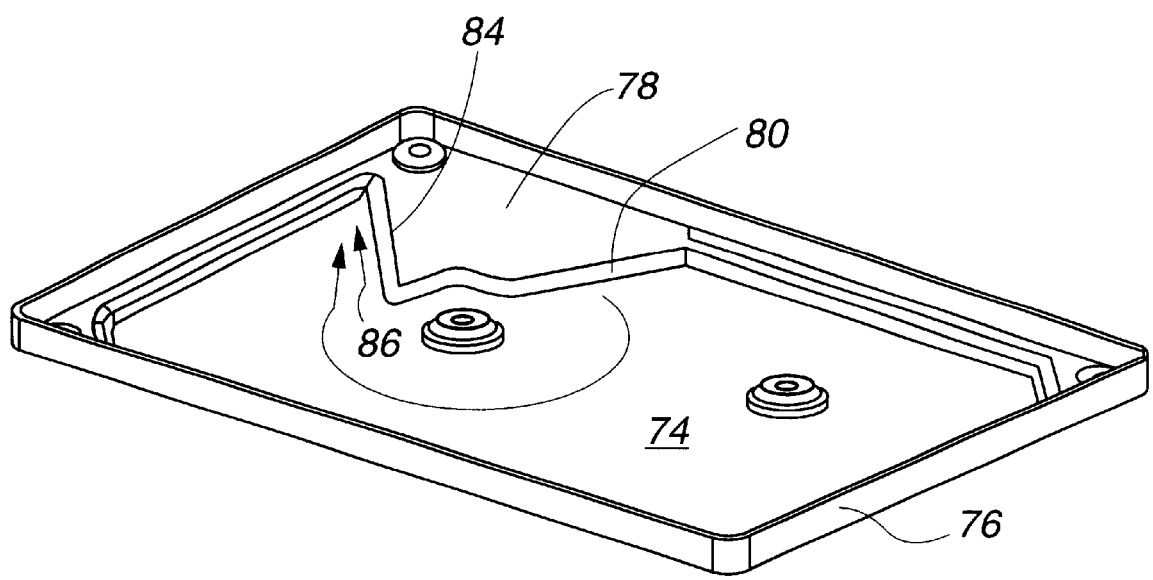
FIG. 9 is an isometric view of a cover plate in accordance with one embodiment of the present invention.

As described above, the region between the lowermost disk of the disk stack and the surface 56 of the baseplate 50 has historically been one of the most contaminant laden areas of the internal chamber of disk drives. This is because prior disk drive filtration methods have been inadequate for filtering air currents generated within this region. The region between the uppermost disk of the disk stack and the cover plate of the disk drive suffers from similar filtration problems. In accordance with one embodiment of the present invention, a dam structure is provided in the cover plate of the disk drive for generating a high pressure ridge between the cover plate and the upper disk which channels the circulating air outward and into the input port 35 of the integrated filter 10. FIG. 9 is a isometric view of the bottom surface 74 of a cover plate 76 having such a dam structure 78. The dam structure 78 is a dropped portion of the surface 74 that is connected to the remainder of the surface 74 by a border ramp 80. The dam structure 78 is located in a corner of the cover plate 76 corresponding to the location of the integrated filter. The dam structure 78 includes a diagonal edge 84 which creates a diagonal pressure ridge which forms a barrier to circumferential air flow above the upper disk. Thus, the circulating air is channeled outward in a direction 86 and flows over the edge of the upper disk and down into the input port 35 of the integrated filter 10.

Figure 10:
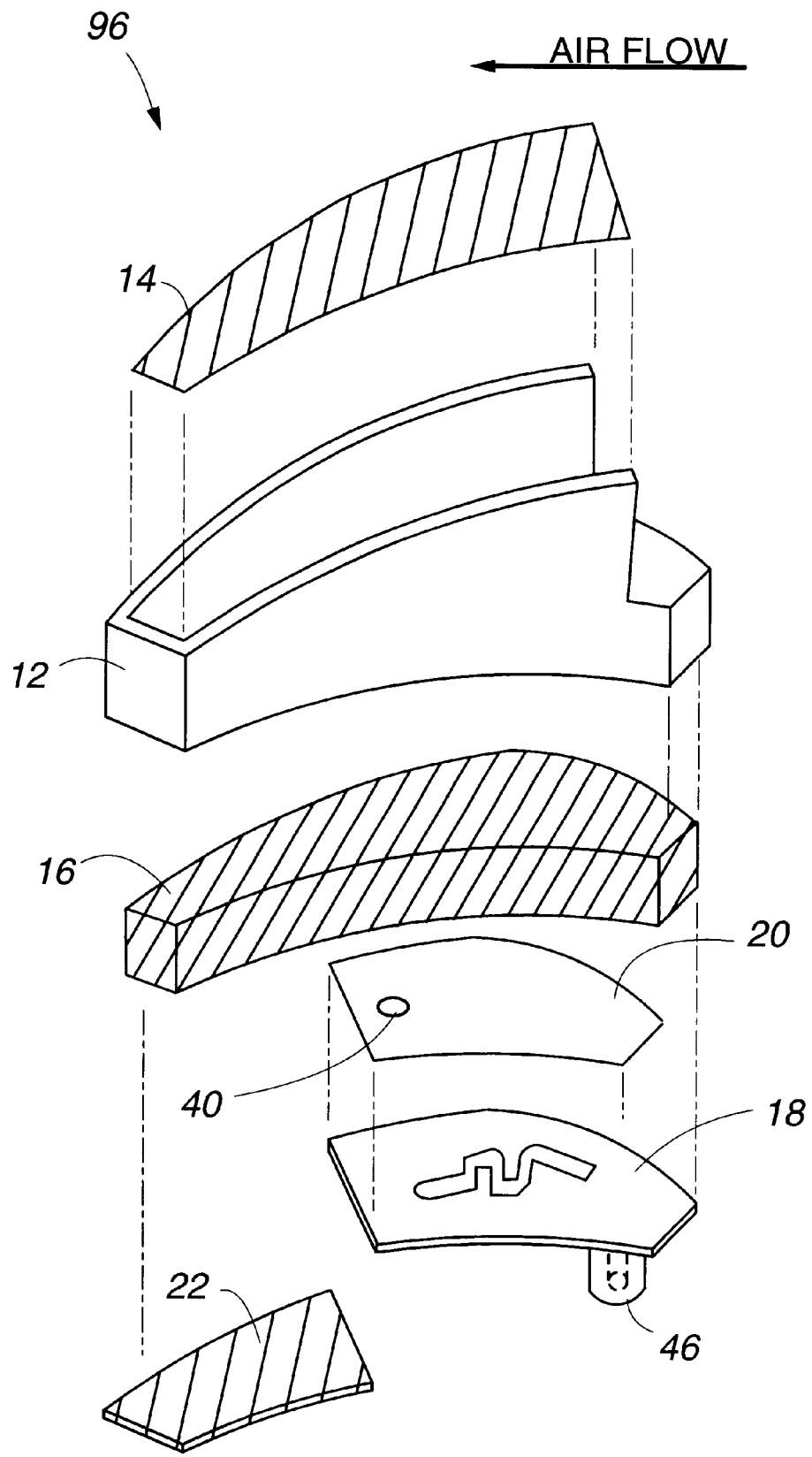
FIG. 10 is an exploded isometric view of an integrated filter assembly in accordance with another embodiment of the present invention.

FIG. 10 is an exploded isometric view of an integrated filter 96 in accordance with another embodiment of the present invention. The same reference numerals are used in FIG. 10 that were used in FIG. 2 to describe similar functionality. As shown, the integrated filter 96 includes: a frame 12, a recirculation filter 14, a chemical filter 16, a diffusion path plate 18, a diffusion cover plate 20, and a breather filter 22. The breather filter 22 is bonded across half of the lower opening in the frame 12 (instead of an opening in a side of the frame 12). Accordingly, the diffusion path plate 18 is only one-half the size of the previous embodiment and covers the other half of the lower opening. Therefore, air passing into the disk drive from the exterior environment first passes through the diffusion channel within the diffusion path plate/cover plate 18, 20 assembly, then through the chemical filter 16, and then through the breather filter 22 to emerge from the underside of the filter 96. The air then travels up the incline of the second recessed portion 62 into the internal chamber 52 of the disk drive. An additional depression within the pocket 48 in the area directly beneath the breather filter 22 may be provided to facilitate air flow from the breather filter 22 into the disk drive chamber.

Figure 11:
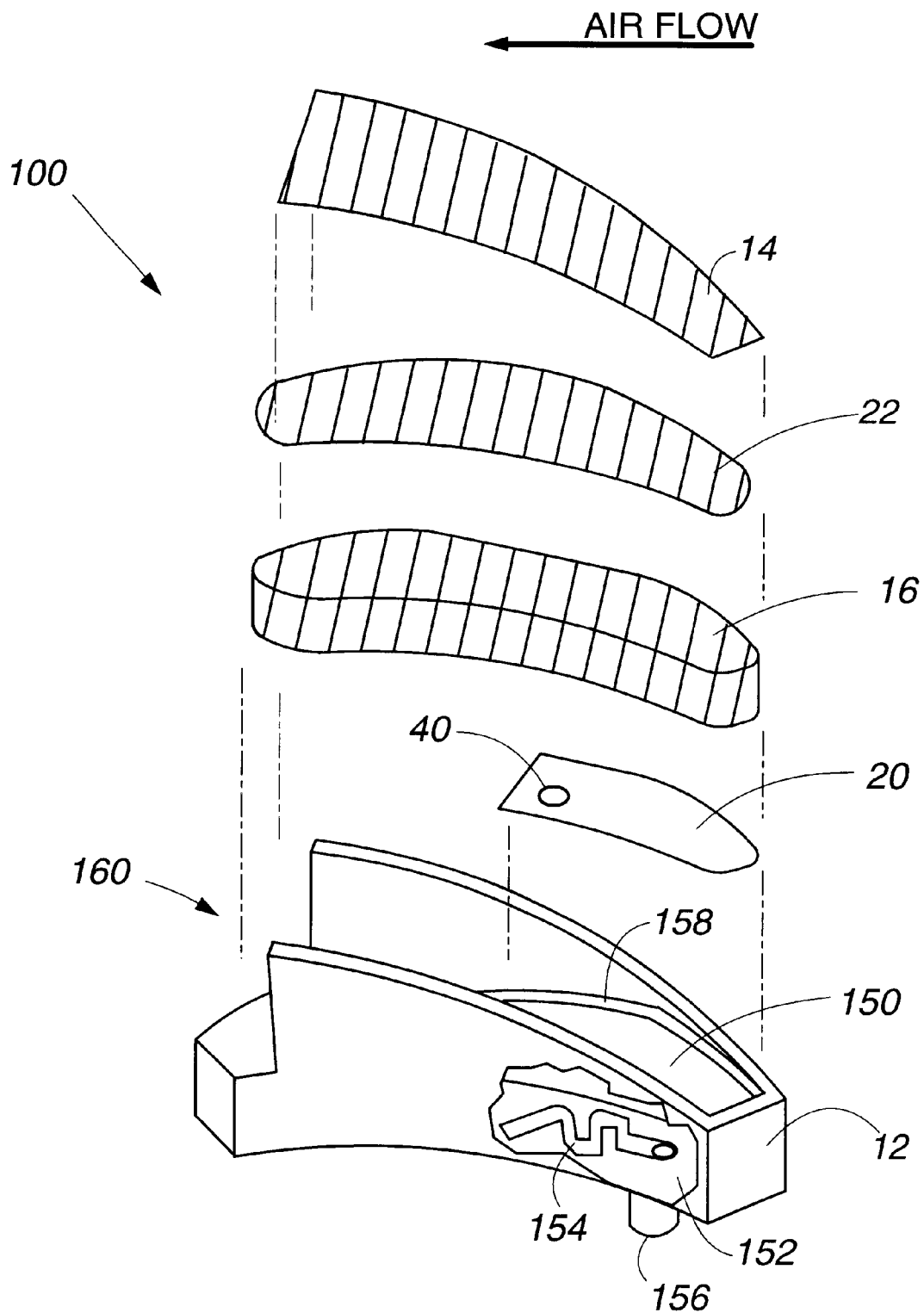
FIG. 11 is an exploded isometric view of an integrated filter assembly in accordance with yet another embodiment of the present invention.

FIG. 11 is an exploded isometric view of an integrated filter 100 in accordance with yet another embodiment of the present invention. The integrated filter 100 includes a frame 12, a recirculation filter 14, a chemical filter 16, a diffusion cover plate 20, and a breather filter 22. The frame 12 includes a single cavity 150 having a floor 152. The floor 152 includes a diffusion channel 154 that is in fluid communication with a breather tube 156 protruding from a bottom of the frame 12. The diffusion cover plate 20 is bonded to the floor 152 in an area above the diffusion channel 154 to form an upper boundary of the channel 154.

The diffusion cover plate 20 includes a port 40 which overlaps a portion of the diffusion channel 154 to provide fluid communication between the diffusion channel 154 and the cavity 150. In an alternate embodiment, the diffusion channel 154 is located on the under surface of the frame 12 and the diffusion cover plate 20 is bonded thereon.

The chemical filter 16 is inserted into the cavity 150 where it rests just above the diffusion cover plate 20. The breather filter 22 is then bonded to a ledge 158 within the cavity 150. The recirculation filter 14 is bonded to the inclined upper edges 34, 36 of the sidewalls 30, 32 of the frame 12, as in the previous embodiments. As before, the integrated filter 100 is inserted into a pocket within the baseplate of a disk drive during disk drive assembly. When properly inserted, the breather tube 156 fits into a breather port in the baseplate pocket which is in fluid communication with the exterior environment.

As illustrated, the configuration of the integrated filter 100 of FIG. 11 is reversed as compared to the prior filter embodiments. That is, instead of the circulating air flowing into a bottom surface of the recirculation filter 14 and emerging from the upper surface thereof, the air currents in this embodiment flow into the recirculation filter 14 through the upper surface and emerge from the lower surface thereof. The recirculation filter 14 impedes the air stream, thus creating a low-pressure region between the recirculation filter 14 and the breather filter 22. This low-pressure region draws air into the disk drive housing through the diffusion channel 154, the chemical filter 16, and the breather filter 22. The air drawn in from the exterior environment, as well as the air flowing through the recirculation filter 14, exits the integrated filter 100 through port 160.

Figure 12:
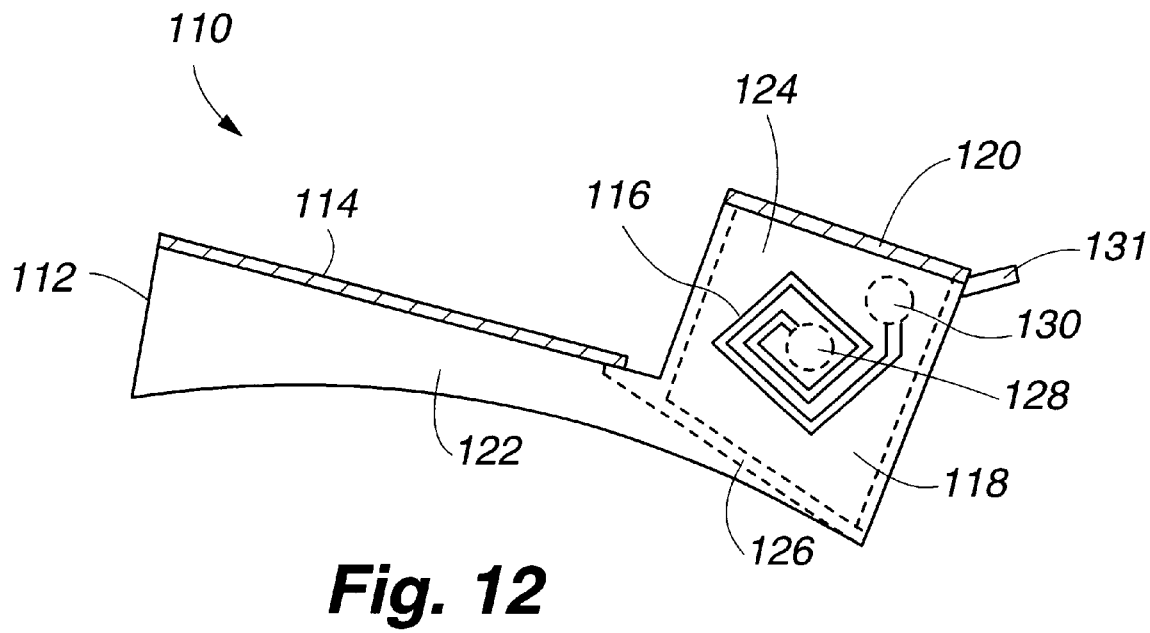
FIGS. 12 and 13 illustrate an integrated filter in accordance with yet another embodiment of the present invention.
Figure 13:
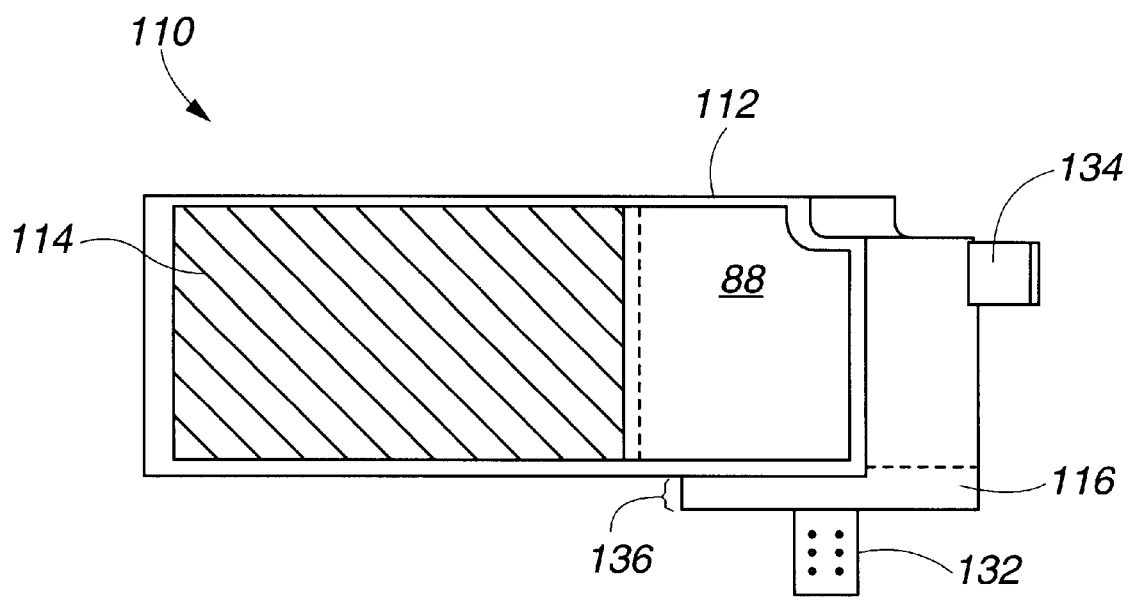
Figure 14:
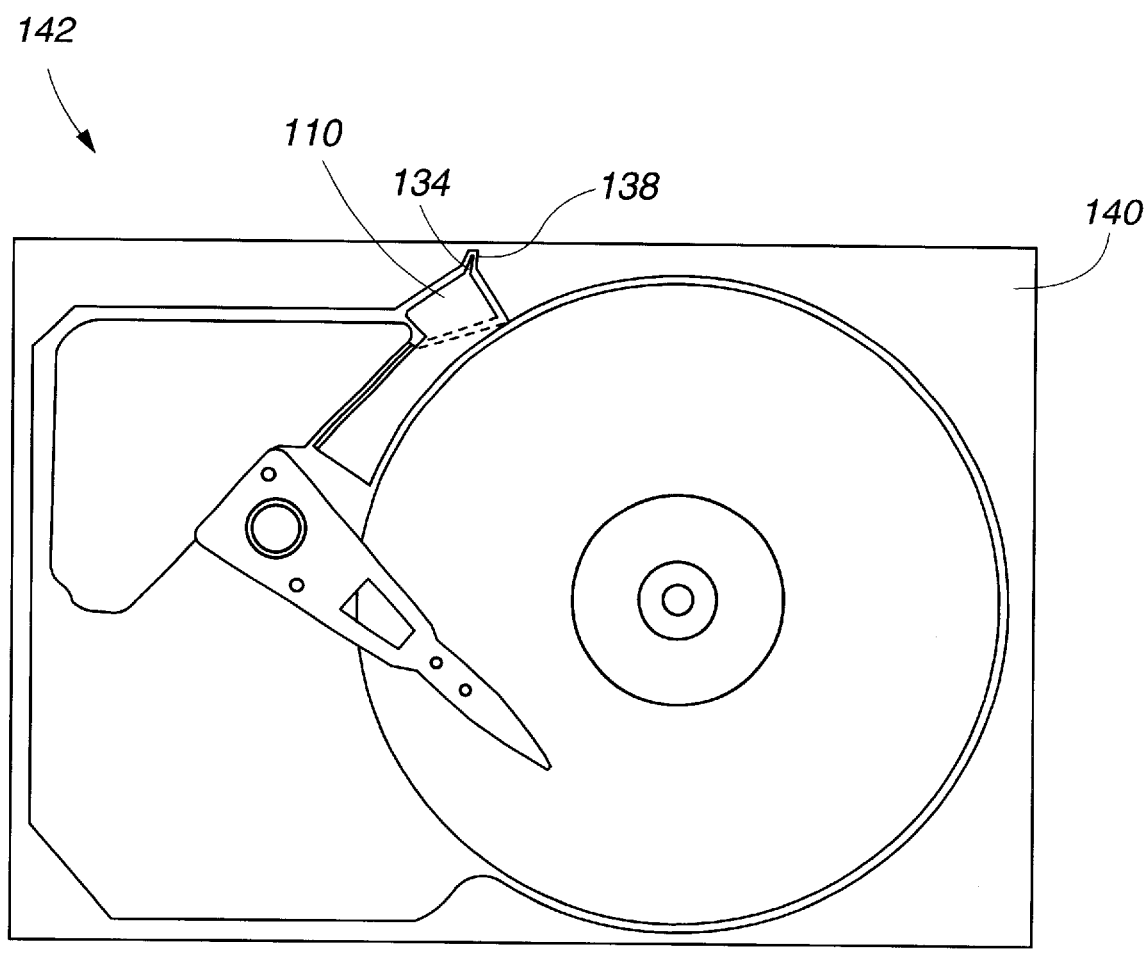
FIG. 14 is a top view of a disk drive illustrating the positioning of the integrated filter of FIGS. 12 and 13 in one embodiment of the present invention.

FIGS. 12 and 13 illustrate an integrated filter 110 in accordance with still another embodiment of the present invention. FIG. 14 illustrates the integrated filter 110 inserted within the housing of a disk drive 142. With reference to FIG. 12, the integrated filter 110 includes a recirculation filter 114, a diffusion channel 116, a chemical filter 118, and a breather filter 120. The filters are housed within a frame 112 having a first cavity 122 and a second cavity 124. The first cavity 122 has the recirculation filter 114 disposed across an opening thereof. The second cavity 124 is separated from the first cavity 122 by a wall 126 and holds the diffusion channel 116, the chemical filter 118, and the breather filter 120.

The diffusion channel 116 is similar to the diffusion path plate assembly discussed above. As shown in FIG. 13, the diffusion channel 116 is located near the bottom of the second cavity 124. With reference to FIGS. 12 and 13, a first port 128 of the diffusion channel 116 couples downward through a breather tube 132 which emerges from the bottom of the frame 112. During disk drive assembly, this tube 132 is inserted within a breather port in the floor of the baseplate 140 that is in fluid communication with the exterior environment. Air flow entering the first port 128 through the tube 132 travels through the diffusion channel 116 and emerges from the second port 130 into an upper portion of the second cavity 124.

The upper portion of the second cavity 124 includes the chemical filter 118. Thus, the air exiting the second port 130 of the diffusion channel 116 next flows through the chemical filter 118. The breather filter 120 is disposed across an opening of the second cavity 124. Thus, after the incoming air is processed by the chemical filter 118 it flows through the breather filter 120 into the internal cavity of the disk drive 142.

With reference to FIG. 13, the frame 112 of the integrated filter 110 includes a base portion 136 which is shaped for insertion into a pocket in the baseplate 140 during disk drive assembly. The pocket in the baseplate 140 includes the breather port discussed above. The frame 112 also includes a tab 134 which fits within a slot 138 in a wall of the baseplate 140 for providing additional support to the filter 110. The disk drive cover plate (not shown) contacts the upper surface of the filter 110 to hold the filter in place during disk drive operation.

Although the present invention has been described in conjunction with its preferred embodiments, it is to be understood that modifications and variations may be resorted to without departing from the spirit and scope of the invention as those skilled in the art readily understand. For example, the shape and element location within the disclosed integrated filter embodiments are not intended to limit the invention in any way. In addition, a single element can be used in accordance with the invention to perform both chemical and breather filtration in the disk drive. Such modifications and variations are considered to be within the purview and scope of the invention and the appended claims.

What is claimed is:

1. An integrated filter assembly for insertion into a disk drive, comprising:
   a support structure adapted to be inserted into a baseplate of the disk drive;
   a recirculation filter integral with said support structure for use in trapping solid particles circulating within a disk drive housing of the disk drive;
   a breather filter integral with said support structure for trapping solid particles entering the disk drive housing from an exterior environment; and
   a chemical filter integral with said support structure for absorbing undesired gases within the disk drive housing.

2. The integrated filter assembly, as claimed in claim 1, further comprising:
   a diffusion channel for providing condensation of vapors within air entering the disk drive housing before said vapors reach an inner portion of the disk drive.

3. The integrated filter assembly, as claimed in claim 1, wherein:
   said support structure includes a first external portion having a shape conforming to a recessed portion the baseplate, said first external portion being inserted into the recessed portion during disk drive manufacture.

4. The integrated filter assembly, as claimed in claim 3, wherein:
   said recirculation filter includes a first surface through which circulating air enters said recirculation filter during disk drive operation, wherein said support structure holds said recirculation filter in a position so that said first surface is inclined with respect to the baseplate.

5. The integrated filter assembly, as claimed in claim 1, wherein:
   said support structure includes a frame having first and second cavities, wherein said first cavity includes said recirculation filter and said second cavity includes said breather and chemical filters.

6. The integrated filter assembly, as claimed in claim 5, wherein said first cavity is above said second cavity.

7. The integrated filter assembly, as claimed in claim 5, wherein:
   said frame includes at least two sidewalls rising in a predominantly vertical direction with respect to a horizontal plane, wherein said at least two sidewalls each have an upper edge that is inclined with respect to the horizontal plane.

8. The integrated filter assembly, as claimed in claim 7, wherein:
   said recirculation filter is attached to the upper edges of said at least two sidewalls and covers said first cavity.

9. The integrated filter assembly, as claimed in claim 5, wherein:
   said chemical filter is located within said second cavity of said frame, said second cavity including a first port and a second port, said first port for exchanging air with an exterior environment and said second port for exchanging air with an inner portion of the disk drive.

10. The integrated filter assembly, as claimed in claim 9, wherein:
    said first port of said second cavity communicates with a breather port in the housing of the disk drive when the integrated filter assembly is inserted into the disk drive, the breather port comprising an opening to the exterior environment.

11. The integrated filter assembly, as claimed in claim 9, wherein:
    said breather filter is situated adjacent to said second port of said second cavity so that air propagating through said second port also propagates through said breather filter.

12. The integrated filter assembly, as claimed in claim 9, wherein:
    said breather filter is situated adjacent to said first port of said cavity so that air propagating through said first port also propagates through said breather filter.

13. The integrated filter assembly, as claimed in claim 1, wherein:
    said support structure includes a frame having a first cavity, wherein said first cavity includes said recirculation filter, said breather filter, and said chemical filter.

14. A disk drive, comprising:
    a baseplate forming a base for said disk drive and constituting a lower boundary of an internal disk drive chamber, said baseplate having a surface portion that is substantially planar and a pocket portion that is recessed with respect to said surface portion, said pocket portion having a breather port in fluid communication with an exterior environment;
    at least one disk for storing data, said at least one disk having a lowermost disk surface that is above and directly opposing said surface portion of said baseplate;
    a spin motor, coupled to said baseplate, for spinning said at least one disk about an axis;
    a transducer for sensing data from said disk as said disk spins about said axis;
    an actuator assembly coupled to said transducer for controllably positioning said transducer with respect to said disk to sense data from a predetermined portion of said disk;
    an integrated filter assembly inserted into said pocket portion of said baseplate, said integrated filter assembly having a recirculation filter, a breather filter, and a chemical filter, said breather filter and said chemical filter being in fluid communication with said breather port of said pocket portion of said baseplate, said recirculation filter for trapping solid particles circulating within said disk drive, said breather filter for trapping solid particles entering said disk drive from said exterior environment through said breather port, and said chemical filter for absorbing undesired vapors entering said disk drive from said exterior environment through said breather port; and a cover plate covering said disk drive and constituting an upper boundary of said internal disk drive chamber.

15. The disk drive, as claimed in claim 14, wherein:

said baseplate includes a first recessed portion leading from said surface portion of said baseplate to said pocket portion for channeling air currents generated in the region between said lowermost disk surface and said surface portion of said baseplate into said recirculation filter of said integrated filter assembly.

16. The disk drive, as claimed in claim 14, wherein:

said cover plate includes a lower surface opposing an uppermost disk surface of said at least one disk, said lower surface of said cover plate having a first planar portion and a second planar portion, wherein said second planar portion is lower than said first planar portion and closer to said uppermost disk surface, wherein said second planar portion is situated above said integrated filter assembly for use in channeling air currents generated in the gap between said uppermost disk surface and said lower surface of said cover plate into said recirculation filter of said integrated filter assembly.

17. The disk drive, as claimed in claim 14, wherein:

said baseplate includes a second recessed portion located between said surface portion and said pocket portion for creating a low pressure region in a vicinity adjacent to said integrated filter assembly to facilitate the passage of air into the disk drive through the chemical and breather filters.

18. The disk drive, as claimed in claim 14, wherein:

said integrated filter assembly further includes a diffusion channel in fluid communication with said breather port for providing condensation of vapors entering said disk drive from said exterior environment.

19. An integrated filter assembly for insertion into a disk drive, comprising:

a support structure that includes a frame, wherein said frame includes first and second cavities and at least two sidewalls rising in a predominantly vertical direction with respect to a horizontal plane, wherein said at least two sidewalls each have an upper edge that is inclined with respect to the horizontal plane;

a recirculation filter coupled to said support structure for use in trapping solid particles circulating within a disk drive housing;

a breather filter coupled to said support structure for trapping solid particles entering the disk drive housing from an exterior environment; and a chemical filter coupled to said support structure for absorbing undesired gases within the disk drive housing;

wherein said first cavity includes said recirculation filter and said second cavity includes said breather and chemical filters.

20. The integrated filter assembly, as claimed in claim 19, further comprising:

a diffusion channel for providing condensation of vapors within air entering the disk drive housing before said vapors reach an inner portion of the disk drive.

21. The integrated filter assembly, as claimed in claim 19, wherein:

said support structure includes a first external portion having a shape conforming to a recessed portion a baseplate of the disk drive, said first external portion being inserted into the recessed portion during disk drive manufacture.

22. The integrated filter assembly, as claimed in claim 21, wherein:

said recirculation filter includes a first surface through which circulating air enters said recirculation filter during disk drive operation, wherein said support structure holds said recirculation filter in a position so that said first surface is inclined with respect to the baseplate.

23. The integrated filter assembly, as claimed in claim 19, wherein:

said first cavity is above said second cavity.

24. The integrated filter assembly, as claimed in claim 19, wherein:

said recirculation filter is attached to the upper edges of said at least two sidewalls and covers said first cavity.

25. The integrated filter assembly, as claimed in claim 19, wherein:

said chemical filter is located within said second cavity of said frame, said second cavity including a first port and a second port, said first port for exchanging air with an exterior environment and said second port for exchanging air with an inner portion of the disk drive.

26. The integrated filter assembly, as claimed in claim 25, wherein:

said first port of said second cavity communicates with a breather port in the housing of the disk drive when the integrated filter assembly is inserted into the disk drive, the breather port comprising an opening to the exterior environment.

27. The integrated filter assembly, as claimed in claim 25, wherein:

said breather filter is situated adjacent to said second port of said second cavity so that air propagating through said second port also propagates through said breather filter.

28. The integrated filter assembly, as claimed in claim 25, wherein:

said breather filter is situated adjacent to said first port of said cavity so that air propagating through said first port also propagates through said breather filter.

* * * * *